March 13, 1928.
W. A. McQUAY
1,662,755
STOOK LOADER AND CONVEYER
Filed Dec. 9, 1924   3 Sheets-Sheet 1
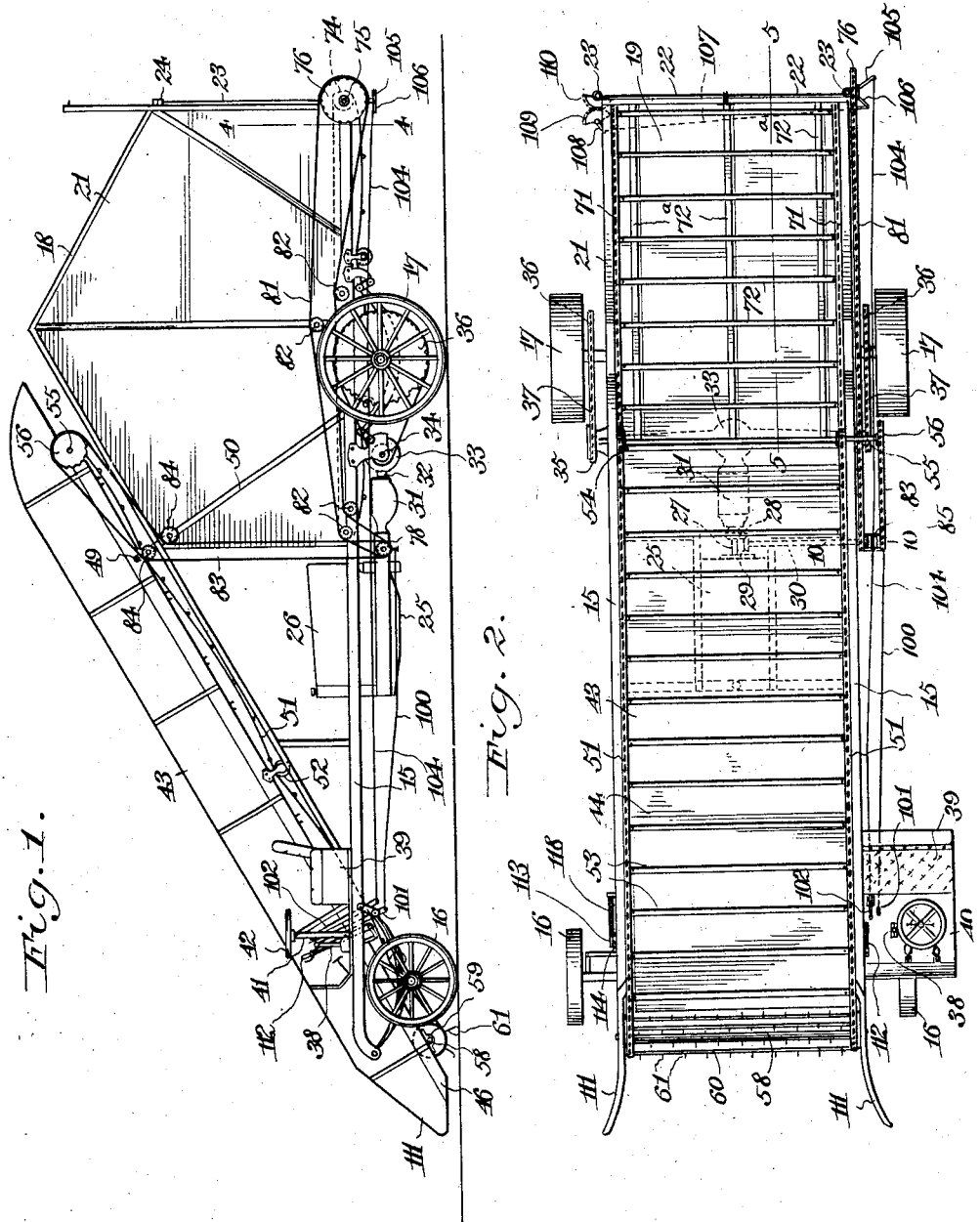
WITNESSES:
INVENTOR.
William A. McQuay
BY
ATTORNEYS

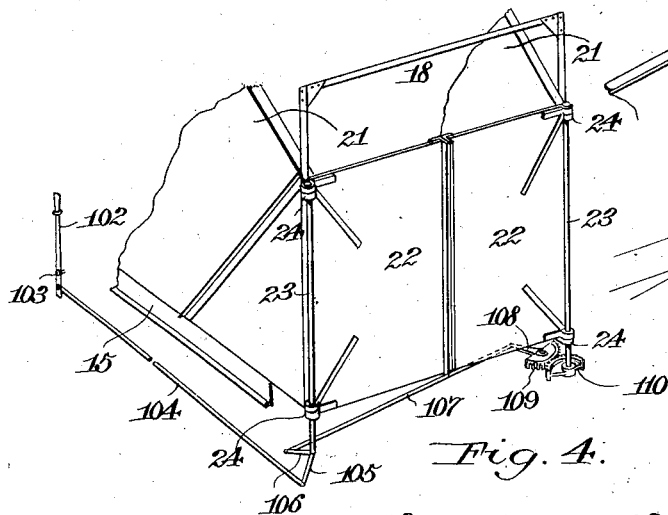
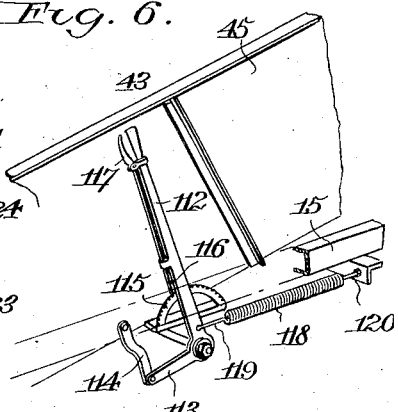
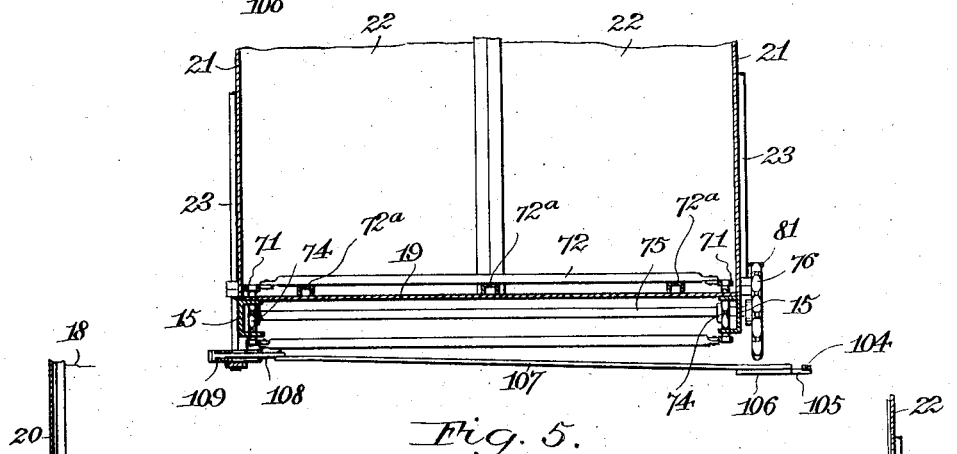
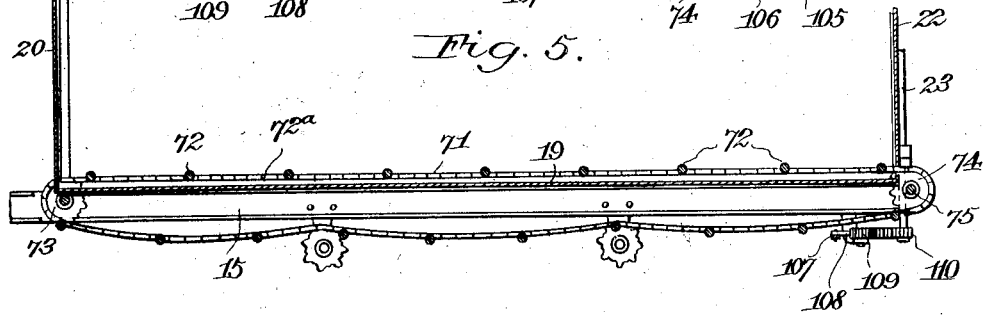

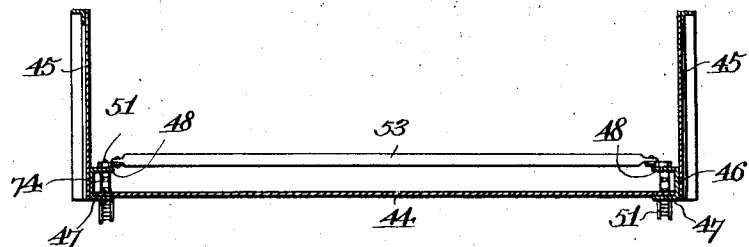
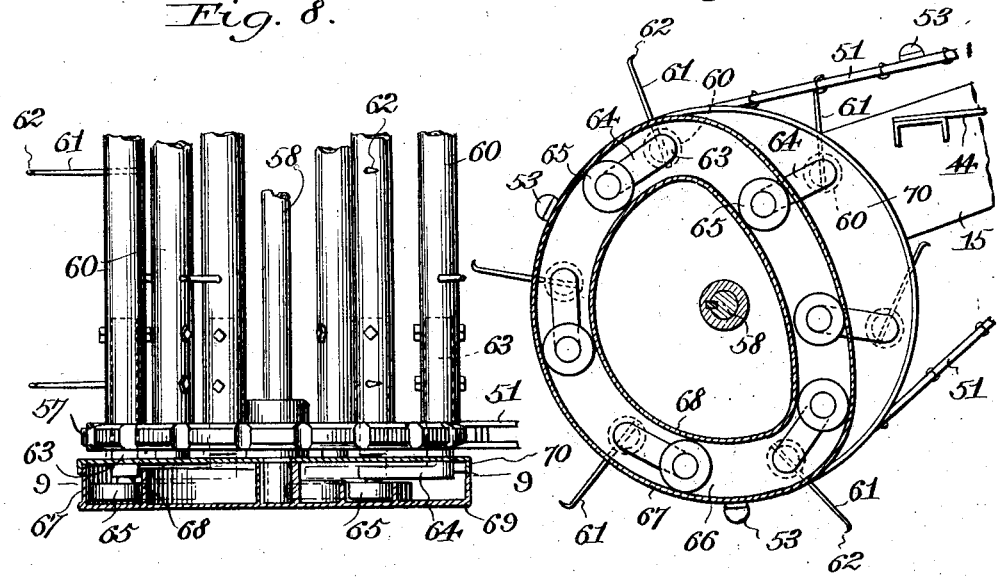
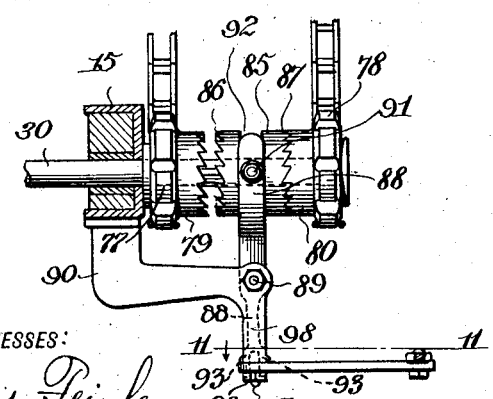
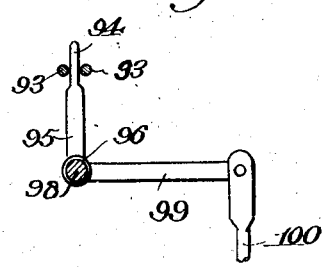

Patented Mar. 13, 1928.

1,662,755

UNITED STATES PATENT OFFICE.

WILLIAM ARTHUR McQUAY, OF DAUPHIN, MANITOBA, CANADA.

STOCK LOADER AND CONVEYER.

Application filed December 9, 1924, Serial No. 754,796, and in Canada September 17, 1924.

This invention relates to the general class of harvesting machines and contemplates an improved machine for gathering, loading, transporting and unloading bundles or sheaves of grain or analogous crops and is especially designed for use in connection with threshing machines.

Other objects of the present invention are to provide a machine which functions to keep the threshing machine running at its full capacity whereby to avoid loss of time; to reduce to a minimum the labor incident to the gathering, loading and unloading of the bundles or sheaves from the vehicle which conveys or transports the same and consequently effects a general economy in the harvesting of the crop.

As a further object the invention comprehends a machine of the character described, which may be employed for stacking hay by gathering the same up from the windrows left by the rake, transporting and discharging the same at a common point with a great saving of manual labor.

As a further object the invention resides in the provision of a machine of the character set forth, in which the means for controlling the gathering, elevating and discharging of the grain as well as the steering and operating means for driving the vehicle, are located within convenient reach of a seat on the machine, whereby the complete machine may be effectually controlled by a single operator.

More specifically the invention contemplates in a machine of the character set forth which includes a single motor or prime mover unit, a selective means for operatively connecting said motor unit with the gathering and elevating means while the vehicle is in motion or at a standstill, or for connecting said motor with the unloading or discharging mechanism either with the vehicle at a standstill or in motion.

Another feature of the invention resides in the construction of the gathering up mechanism by means of which the stooks or sheaves are initially lifted and conveyed to the elevator of the loading mechanism.

The invention further resides in the comparative simplicity of the machine, the economy in the manufacture and production thereof and in the general efficiency of its operation.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a side elevation of a machine constructed in accordance with the invention;

Fig. 2 is a plan view thereof;

Fig. 3 is a fragmentary perspective view of the rear end illustrating the controlling means for the discharge gates of the cradle or body;

Fig. 4 is a transverse sectional view therethrough taken approximately on the line indicated at 4—4 in Fig. 1;

Fig. 5 is a fragmentary enlarged longitudinal sectional view taken approximately on the line 5—5 in Fig. 2 and illustrating the discharging or unloading mechanism;

Fig. 6 is a fragmentary detail perspective view of the elevator tilting control;

Fig. 7 is an enlarged transverse sectional view through the elevator constituting a part of the loading mechanism;

Fig. 8 is a fragmentary sectional plan view through the gathering up means of the loading mechanism;

Fig. 9 is a fragmentary vertical sectional view therethrough taken approximately on the line 9—9 of Fig. 8;

Fig. 10 is a detail fragmentary sectional view taken approximately on the line 10—10 of Fig. 2 illustrating the selective clutch mechanism for controlling the loading and unloading mechanisms;

Fig. 11 is a detail horizontal sectional view taken approximately on the line 11—11 of Fig. 10.

Referring to the drawings by characters of reference 15 designates the chassis frame which is supported at the forward end by the front steering wheels 16 and at the rear by rear driving wheels 17. At the rear end of the machine a cradle body member 18 is supported upon the chassis frame to constitute a compartment for receiving and transporting the material. The said cradle or body member includes a bottom or floor 19 preferably of galvanized steel, a front wall 20 and side walls 21. The rear end of the body or cradle member 18 is closed by a pair of outwardly swinging doors 22 which are connected to vertical hinge shafts 23 which extend through bearing ears 24 mounted on the rear edge of the side walls 21. The motor or prime mover 25 is housed by a hood 26 and is supported from the chassis at a point immediately in front of the body or cradle 18. The motor shaft 27 has keyed thereto a bevel gear drive pinion 28 which meshes with a bevel gear 29 keyed on a laterally disposed shaft 30. The usual transmission 31 receives the rear end of the motor shaft 27 for transmitting power to the propeller shaft 32 extending into the usual differential 33. Laterally projecting driven shafts 34 are provided at their outer ends with sprockets 35 which are connected to the drive sprockets 36 by sprocket chains 37 for transmitting power to the rear driving wheels 17. The transmission is suitably connected with a gear shift lever 38 which is located adjacent the driver's seat 39 mounted on a laterally projecting platform 40 at one side of the chassis frame 15 and adjacent the forward end of the machine. The usual steering column 41 and steering wheel 42 is mounted adjacent the driver's seat on the platform 40 whereby steering and controls for driving the vehicle are located within a convenient reach of the operator.

The loading mechanism which includes means for gathering up, elevating and discharging the stacks or sheaves into the body or cradle 18 consists of the inclined trough 43 which is of substantially U-shape construction in cross section including a bottom wall 44, side walls 45 and channel frame members 46 upon the lower flanges 47 of which the bottom 44 rests and is secured. The side walls 45 are secured to the web of the channel members and the lower flanges 47 and upper flanges 48 extend inwardly from the web as illustrated in Fig. 7. The trough 43 is fulcrumed as at 49 adjacent its rear end to the upper ends of angular braces 50 attached to the outer sides of the body or cradle 18. An endless conveyer consisting of sprocket chains 51 having the upper leads trained over the upper flanges 48 of the channel members 46 and the lower leads trained over guide elements 52 are connected by transversely disposed longitudinally spaced cross bars or flights 53. At the rear end of the trough 43 the sprocket chains 51 are trained over guide sprockets 54 mounted on a transverse shaft 55 which has keyed thereto at one end a driving sprocket 56. At the forward end of the trough the sprocket chains 51 are trained around the sprockets 57 mounted on a transverse shaft 58 which shaft is supported at its opposite ends in the bearings 59 on the channel members 46 of the trough member.

The pick-up mechanism consists of a plurality of annularly and concentrically arranged transverse tubular members 60 the opposite ends of which extend through openings in the sprockets 57. Each of the tubular members 60 is provided with a plurality of radially projecting fingers 61 having hooked terminals 62 at the free extremities thereof. The opposite ends of the tubular members 60 have secured therein shanks 63 of crank arms 64 to the outer free ends of which crank arms rollers 65 are journaled. A cam groove 66 is defined between the inwardly projecting flanges 67 and 68 of a stationary housing 69 which is open at its inner side. A rotary cover plate 70 for the open inner side of the housing is provided with a plurality of concentric openings through which the shanks 63 of the crank arms 64 extend whereby the cover plate 70 rotates with the shanks 63, the tubular elements 50 and the sprockets 57.

A discharging or unloading conveyer consisting of a pair of sprocket chains 71 connected by transverse cross bars 72 is provided and the upper lead of said conveyer is mounted for movement over the inverted channel iron wear elements 72ª on the bottom or floor 19 of the body or cradle 18. The forward end of the conveyer sprocket chains 71 are trained over guide sprockets 73 and the rear end of said conveyer sprocket chains are trained over combined guide and driven sprockets 74. The guide and driven sprockets 74 are keyed to a transverse shaft 75 at one end of which a drive sprocket 76 is keyed.

A selective clutch mechanism for transmitting the power from the motor driven shaft 30 to the loading mechanism or unloading mechanism is provided which consists of a pair of sprockets 77 and 78 each of which is loosely mounted on the outer end of the shaft 30 and properly maintained in axially spaced relation. The sprocket 77 has secured thereto a clutch element 79 and the sprocket 78 has secured thereto a clutch element 80. The sprocket 77 is operatively connected with the drive sprocket 76 by a sprocket chain 81 trained over guide sprockets 82. The sprocket 78 is operatively connected with the drive sprocket 56 by a sprocket chain 83 trained about said sprockets 78 and 55 and over guide sprockets 84. A shiftable clutch element 85 is splined on the outer end of the shaft 30 for axial movement and the same is provided at its opposite ends respectively with clutch teeth 86 and 87. The sliding clutch element 85 is capable of shifting movement to engage the clutch teeth 86 with the clutch element 79 of the sprocket 77 or to engage the clutch teeth 87 with the clutch element 80 of the sprocket 78. The sliding clutch element 85 is also shiftable to an intermediate position whereby the clutch teeth 86 and 87 are out of active engagement with either of the clutch elements 79 or 80. Under this arrangement it will be obvious that either of the sprockets 77 or 78 may be coupled with the shaft 30 whereby either the gathering and loading means or the unloading means may be driven while the machine is in motion or at rest. In order to provide means for controlling the selective clutch mechanism from the driver's seat, a shifting fork 88 is pivoted as at 89 in a bracket 90 carried by the chassis frame 15. The upper ends of the tines of the shifting fork are provided with studs 91 which engage in a groove 92 in the slidable clutch element 85. The lower end of the shifting fork is bifurcated and receives between the furcations 93 thereof the terminal 94 of the arm 95 of a bell crank 96 which is pivoted as at 97 to the depending arm 98 of the bracket 90. The remaining arm 99 of the bell crank 96 is connected by a connecting rod 100 with a controlling lever 101 mounted on the platform 40 adjacent the driver's seat.

In order to provide means for swinging the rear doors 22 of the cradle or body 18 to opened or closed position from the driver's seat, an operating lever 102 is pivoted as at 103 on the platform 40 and said operating lever is connected by a connecting rod 104 to a radial arm 105 at the lower end of one hinge shaft 23. The said hinge shaft is further provided with a second radial arm 106 which is connected by a connecting rod 107 with the radial arm 108 of a gear segment 109. The gear segment 109 meshes with a second gear segment 110 keyed to the hinge shaft 23 of the opposite door.

At its forward end the trough 43 has the terminals 111 of its side walls 45 curved or flared outwardly to facilitate the picking-up of the stooks, sheaves or other material. Due to irregularities of the surface over which the machine is operated and to compensate therefor, it is essential to effect a tilting of the trough to elevate or lower the forward end and the pick-up mechanism carried thereby. In order to provide means for this purpose, a tilting lever 112 is provided which is fulcrumed to the chassis frame 15 adjacent the driver's seat 39. The said lever is provided with an angularly disposed arm 113 connected by a link 114 to the trough 43 adjacent its forward end. The lever 112 is maintained in its various shifted positions by a rack 115 and a detent 116 which is controlled by a hand grip 117. In order to minimize the lifting force essential to the elevation of the forward end of the trough a counter-spring 118 is employed which is connected respectively at its opposite ends 119 and 120 to the lever 112 and the chassis frame 15.

In use and operation of the machine, it is proposed generally to effect the gathering up and loading while the machine is in motion in a forward direction. The hooked terminals 62 of the fingers or tines 61 serve to grasp and engage the stooks, sheaves or other material in the path of movement of the machine and lift and discharge the same onto the endless conveyer flights 53 to elevate the same through the trough 43 and subsequently discharge the same into the cradle or body 18.

The operator seated in the driver's seat 39 may at will effect the raising and lowering of the forward end of the elevator, trough and gathering up mechanism whereby the machine conforms to irregularities of the surface over which it is being operated. When the body or cradle 18 is loaded to full capacity, the operator by manipulating the clutch lever 101 throws the sliding clutch element 85 to a neutral position until the machine is brought to the point for discharge of its load. The operator then manipulates the selective clutch member 101 to bring the teeth 86 of the sliding clutch element 85 into mesh with the clutch element 79 whereby to drive the sprocket 77 and the unloading conveyer. It is of course understood that previous to this operation the operator manipulates the lever 102 to open the rear doors 22 of the cradle or body 18. The load is thus mechanically discharged from the cradle or body 18.

From the foregoing it will thus be seen that a comparatively simple and inexpensive machine of the character set forth has been devised which functions to effect a material economy in the cost of harvesting grain or other crops.

I claim:

1. In a machine of the character described comprising a vehicle including a chassis, a body mounted on the rear end of the chassis, said body having an open upper end and an open rear end, closure means for the rear end, an inclined elevator means extending upwardly from the forward end of the chassis to a point above the open upper end of the body, means at the forward end of the elevator for picking up and discharging the material in the path of movement of the vehicle onto the lower end of the elevator, a conveyer having its upper lead movable over the bottom or floor of the body from the forward end thereof to the rear open end, a common motor on the chassis for relatively driving the vehicle and the loading and unloading means and a clutch operable from the driver's seat to operatively connect the loading and unloading means selectively with the motor.

2. In a machine of the character described comprising a vehicle including a chassis, a body mounted on the rear end of the chassis, said body having an open upper end and an open rear end, closure means for the rear end, an inclined elevator means extending upwardly from the forward end of the chassis to a point above the open upper end of the body, means at the forward end of the elevator for picking up and discharging the material in the path of movement of the vehicle onto the lower end of the elevator, a conveyer having its upper lead movable over the bottom or floor of the body from the forward end thereof to the rear open end, a common motor on the chassis for respectively driving the vehicle and the loading and unloading means and a clutch operable from the driver's seat to operatively connect the loading and unloading means selectively with the motor and means controllable from the driver's seat for opening and closing the closure members for the rear open end of the body.

3. In a machine of the character described comprising a vehicle including a chassis, a body mounted on the rear end of the chassis, said body having an open upper end and an open rear end, closure means for the rear end, an inclined elevator means extending upwardly from the forward end of the chassis to a point above the open upper end of the body, means at the forward end of the elevator for picking up and discharging the material in the path of movement of the vehicle onto the lower end of the elevator, a conveyer having its upper lead movable over the bottom or floor of the body from the forward end thereof to the rear open end, a common motor on the chassis for respectively driving the vehicle and the loading and unloading means and a clutch operable from the driver's seat to operatively connect the loading and unloading means selectively with the motor and means controllable from the driver's seat for opening and closing the closure members for the rear open end of the body and means operable from the driver's seat for raising and lowering the forward end of the elevator to compensate for irregularities of the surface over which the machine is moving.

4. A machine of the character described, including a vehicle comprising a wheeled frame, a body, means for gathering up and loading material in the path of movement of the machine, into the body, and means for unloading the material from the body, the said gathering-up means consisting of a rotary drum operable by the loading means and said drum comprising an annular concentric series of shafts having radial fingers provided with hooked terminals and cam means for swinging the fingers to a position within the confines of the drum immediately after the discharge of the material onto the loading mechanism.

5. In a machine of the class described, including a wheeled frame, a body having a front end, a bottom, and side walls and open at the top and rear end, a conveyer means movable over the bottom wall from the front to the rear for discharging the contents of the body, swinging closure means for the rear open end, and loading means including an inclined loader trough extending from adjacent the ground to a point upward above the open upper end of the body, means within the loader trough for elevating the material and discharging the same into the body, and means at the forward end of the loader trough for picking up and depositing upon the elevating means, the material into the path of movement of the mouth of the trough.

WILLIAM ARTHUR McQUAY.